US012119130B2

(12) United States Patent
Temnykh et al.

(10) Patent No.: US 12,119,130 B2
(45) Date of Patent: Oct. 15, 2024

(54) PERMANENT MAGNET INSERTION DEVICE

(71) Applicant: CORNELL UNIVERSITY, Ithaca, NY (US)

(72) Inventors: Alexander Temnykh, Ithaca, NY (US); Ivan Temnykh, Pennsylvania Furnace, PA (US)

(73) Assignee: CORNELL UNIVERSITY, Ithaca, NY (US)

( * ) Notice: Subject to any disclaimer, the term of this patent is extended or adjusted under 35 U.S.C. 154(b) by 979 days.

(21) Appl. No.: 17/095,529

(22) Filed: Nov. 11, 2020

(65) Prior Publication Data

US 2021/0142925 A1 May 13, 2021

Related U.S. Application Data

(60) Provisional application No. 62/933,801, filed on Nov. 11, 2019.

(51) Int. Cl.
*B23P 19/00* (2006.01)
*G21K 1/093* (2006.01)
*H05K 13/04* (2006.01)

(52) U.S. Cl.
CPC .................................. *G21K 1/093* (2013.01)

(58) Field of Classification Search
CPC .......... G21K 1/093; H01F 7/0273; H01F 7/04
See application file for complete search history.

(56) References Cited

U.S. PATENT DOCUMENTS 5,383,049 A * 1/1995 Carr ........................ H05H 7/00 359/283
9,275,781 B2 3/2016 Temnykh
9,607,745 B2 3/2017 Temnykh
2009/0191073 A1* 7/2009 Kopecek ................ F04B 17/04 417/415

(Continued)

OTHER PUBLICATIONS

Temnykh, "ID Technology as CHESS: past, present and plan for future", 8pgs, Apr. 17, 2018, National Science Foundation.

(Continued)

*Primary Examiner* — Paul D Kim
(74) *Attorney, Agent, or Firm* — Troutman Pepper Hamilton Sander LLP (Rochester)

(57) ABSTRACT

The present technology relates to a permanent magnet insertion device that includes a frame and a plurality of single pole assemblies adjacently disposed within the frame. Each of the single pole assemblies includes a first member bearing a first permanent-magnet and a second member bearing a second permanent-magnet. The first permanent-magnet and the second permanent-magnet are spaced apart by a gap. At least one of the first member or the second member is movable relative to the other of the first member or the second member to increase or to decrease a dimensional value of the gap. A hydraulic driver is configured to move the first member relative to the second member to increase or to decrease the dimensional value of the gap. A mechanical driver is configured to move the first member relative to the second member to increase or to decrease the dimensional value of the gap.

18 Claims, 8 Drawing Sheets

(56) References Cited

U.S. PATENT DOCUMENTS

2018/0098412 A1* 4/2018 Qiao .................... G21K 1/003

OTHER PUBLICATIONS

Temnykh et al., “Hydraulic-assist driver for compact insertion devices”, 2019, 7 pgs, Elsevier.
Temnykh et al., “Method for permanent magnet undulator parameter stabilizing against temperature variation”, 2020, 6pgs, Elsevier.
Temnykh et al., “Compact variable-gap undulator with Hydraulic-Assist Driver”, 2020, 10pgs, Elsevier.
Carr; “Magnetic Counterforce for Insertion Devices”, Synchrotron Rad. (2003). 10, 269-271, Retrieved from the Internet<URL: https://onlinelibrary.wiley.com/doi/pdf/10.1107/S0909049503002930>.
Kinjo et al., “Lightweight compact Variable-gap Undulator with Force Cancellation System Based on Multipole Monolithic Magnets”; Review of Scientific Instruments, 88, 073302 (2017), Retrieved from the Internet<URL: https://aip.scitation.org/doi/full/10.1063/1.4991652>.
Strelnikov et al., “Vertically Polarizing Undulator with Dynamic Compensation of Magnetic Forces” Phys. Rev. Accel. Beams 20, 010701 (2016), 14pgs, Retrieved from the Internet<URL: https://journals.aps.org/prab/abstract/10.1103/PhysRevAccelBeams.20.010701.
Temnykh et al., “Compact Undulator for the Cornell High Energy Synchrotron Source: Design and Beam Test Results”, J. Phys.: Conf. Ser. 425 032004, 2013, 6 pages, Retrieved from the Internet<URL: http://iopscience.iop.org/article/10.1088/1742-6596/425/3/032004/meta>.
Temnykh, “Delta Undulator for Cornell Energy Recovery Linac”, Phys. Rev. ST Accel. Beams 11, 120702, 2008, 10pgs, Retrieved from the Internet<URL: https://journals.aps.org/prab/abstract/10.1103/PhysRevSTAB.11.120702.
H.-D. Nuhn et al., 2015, Commissioning of the Delta Polarizing Undulator At LCLS*, SLAC-PUB-16404.

* cited by examiner

PERMANENT MAGNET INSERTION DEVICE

This application claims benefit of U.S. Provisional Patent Application No. 62/933,801, filed Nov. 11, 2019, the entirety of which is incorporated herein by reference.

GOVERNMENT FUNDING

This invention was made with Government support under Grant Number DMR-1332208 awarded by the National Institutes for Health. The government has certain rights in the invention.

FIELD

The present technology relates to a permanent magnet insertion device. More specifically, the present technology relates to a permanent magnet insertion device with a hydraulic driving system that provides a variable insertion device gap while not impacting performance and methods of use thereof.

BACKGROUND

Magnetic assembly insertion devices (IDs), or undulators, are used at synchrotron radiation sources such as storage rings. These devices are used in the medical and industrial markets for x-ray or longer wavelength photon beam purposes. Conventional IDs that are used to generate synchrotron radiation in storage rings, for example, usually include two or more permanent-magnet arrays that must be positioned with respect to each other with a precision of a few microns. A high-energy electron beam passing through this gap parallel to the permanent-magnet arrays "wiggles" back and forth in its trajectory due to the periodic magnetic field. Because the required precision of positioning the permanent-magnet arrays with respect to each other is so high, and the magnetic forces between the arrays are very strong (having a nonlinear dependence on the array position), conventional driving mechanisms are complex, massive, and expensive.

A number of approaches have been proposed to reduce the magnetic force load on the driving mechanisms for magnetic assembly IDs. Additional magnet arrays have been utilized to generate a counterforce. This approach requires a more complex design, as well as adjustments based on the period and strength of the compensating arrays. Another approach utilized conical springs to compensate for the magnetic force on the ID. This approach, however, required custom designed springs that add to the complexity and expense of the ID device.

The present technology is directed to overcoming these and other deficiencies in the art.

SUMMARY

One aspect of the present technology relates to a permanent magnet insertion device. The permanent magnet insertion device includes a frame. A plurality of single pole assemblies are adjacently disposed within the frame. Each of the single pole assemblies include a first member bearing a first permanent-magnet and a second member bearing a second permanent-magnet. The first permanent-magnet and the second permanent-magnet are spaced apart by a gap that is adjustable to a selected dimensional value between a first dimensional value and a second dimensional value, the first dimensional value being smaller than the second dimensional value. At least one of the first member or the second member is movable relative to the other of the first member or the second member to increase or to decrease a dimensional value of the gap. A hydraulic driver is configured to move the first member relative to the second member to increase or to decrease the dimensional value of the gap. A mechanical driver is configured to move the first member relative to the second member to increase or to decrease the dimensional value of the gap.

Another aspect of the present technology relates to a computer-controlled method of maintaining a stable insertion device gap in a permanent magnet insertion device. The method includes receiving, via a controller, measurement data for a gap between a first permanent-magnet and second permanent-magnet in a single pole assembly, the first permanent-magnet being attached to a first portion of the single pole assembly and the second permanent-magnet being attached to a second portion of the single pole assembly, the second portion of the insertion device being movable relative to the first portion of the single pole assembly to change the gap between the first permanent-magnet and the second permanent-magnet. A magnetic force is determined between the first permanent-magnet and the second permanent-magnet. A hydraulic driver is driven to apply a first force to the single pole assembly in opposition to the magnetic force. A mechanical driver is driver to apply a second force to the single pole assembly in opposition to the magnetic force. The first force and second are balanced to maintain the measured gap at a setting selected from a plurality of available settings within a range of settings.

The present technology advantageously provides a permanent magnet insertion device (ID) that includes a driver system that incorporates at least one compact hydraulic cylinder along the ID that compensates for the magnetic force acting on the ID. The hydraulic cylinder reduces the load on the conventional mechanical drivers used in IDs, which allows for a more compact ID without comprising performance. The compact hydraulic-assisted driver in the permanent magnet ID of the present technology provides the ability to precisely control the ID gap, which allows for a compact, light-weight, easily fabricated ID, while allowing for stronger fields and smaller magnetic field errors. The present technology further is flexible and allows for optimizing dynamic properties of the ID.

DETAILED DESCRIPTION

The present technology relates to a permanent magnet insertion device. More specifically, the present technology relates to a permanent magnet insertion device with a hydraulic driving system that provides a variable insertion device gap while not impacting performance and methods of use thereof.

One aspect of the present technology relates to a permanent magnet insertion device. The permanent magnet insertion device includes a frame. A plurality of single pole assemblies are adjacently disposed within the frame. Each of the single pole assemblies include a first member bearing a first permanent-magnet and a second member bearing a second permanent-magnet. The first permanent-magnet and the second permanent-magnet are spaced apart by a gap that is adjustable to a selected dimensional value between a first dimensional value and a second dimensional value, the first dimensional value being smaller than the second dimensional value. At least one of the first member or the second member is movable relative to the other of the first member or the second member to increase or to decrease a dimensional value of the gap. A hydraulic driver is configured to move the first member relative to the second member to increase or to decrease the dimensional value of the gap. A mechanical driver is configured to move the first member relative to the second member to increase or to decrease the dimensional value of the gap.

Figure 1:
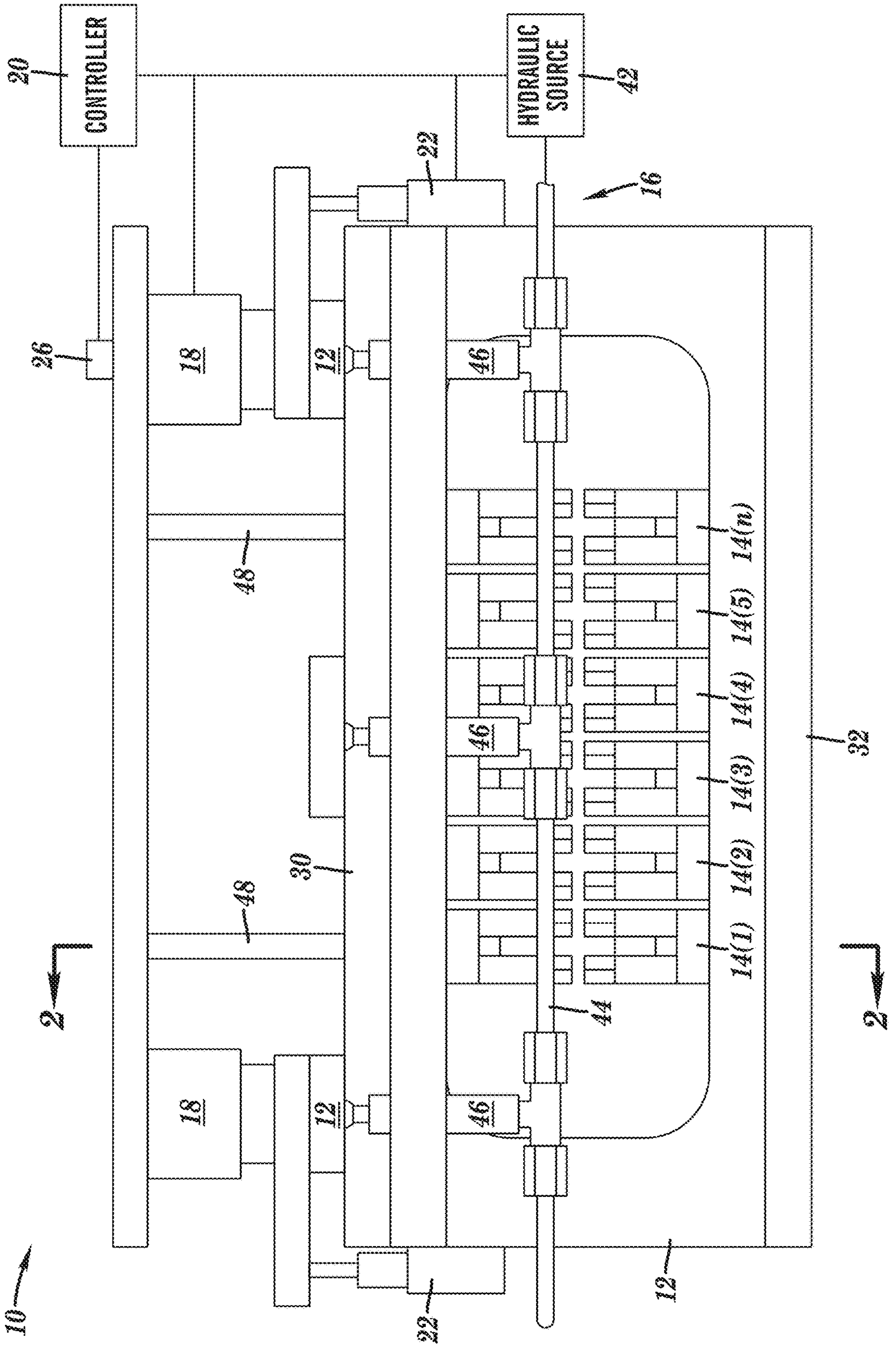
FIG. 1 is a partial schematic and partial block diagram of a permanent-magnet insertion device in accordance with an embodiment of the present technology.
Figure 2:
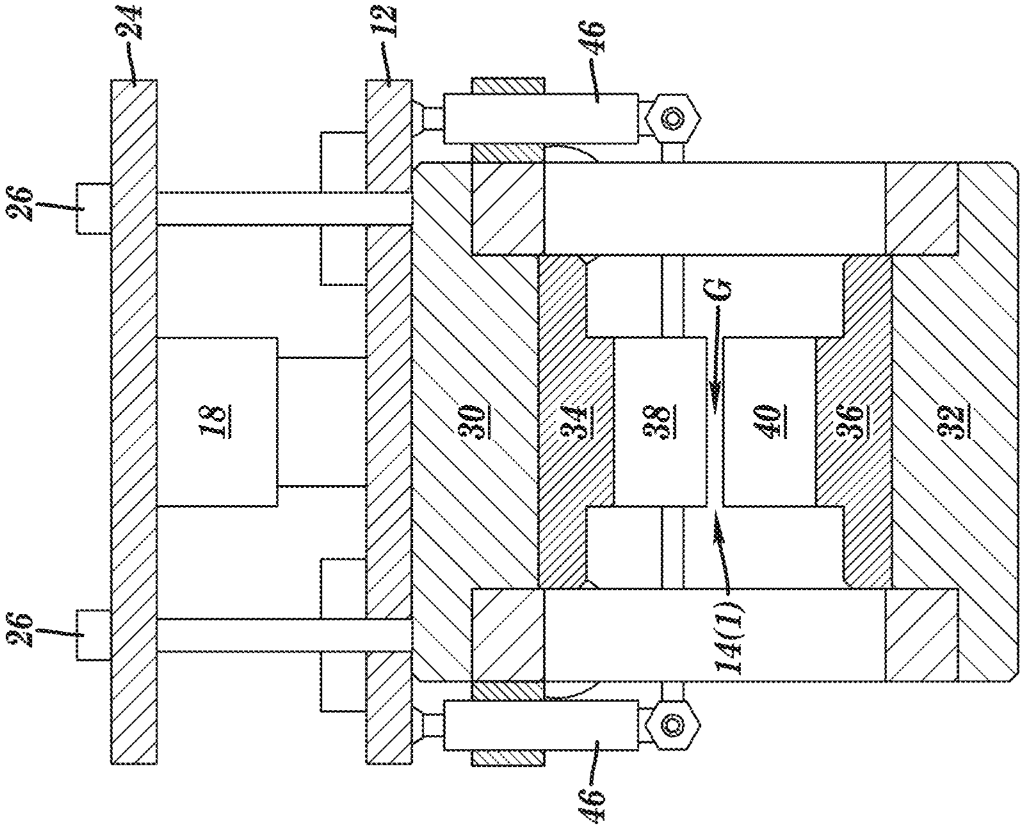
FIG. 2 is a cross-sectional view of the permanent-magnet insertion device shown in FIG. 1.

FIGS. 1 and 2 illustrate a first embodiment of permanent magnet insertion device 10 of the present technology. Permanent magnet insertion device 10 includes frame 12, single pole assemblies 14(1)-14(*n*) supported by frame 12, hydraulic driver system 16, mechanical drivers 18, controller 20, measurement devices 22, flex plate 24, and strain gauges 26, although permanent magnet insertion device 10 may include other types or numbers of elements or components in other configurations. By way of example, the hydraulic driver system 16 of permanent magnet insert device 10, as described in further detail below, may be employed in the undulator systems disclosed in U.S. Pat. Nos. 9,275,781 and 9,607,745, the disclosures of which are incorporated herein by reference in their entirety. Hydraulic driver system 16 reduces the load on mechanical drivers 18, which allows for a more compact ID, while allowing for stronger fields and smaller magnetic field errors.

In one example, frame 12 is constructed of an aluminum material. In one example, frame 12 has dimensions of about 1.5 m (length) by about 250 mm (width) by about 360 mm (height), although other dimensions may be employed. Frame 12 is configured to support single pole assemblies 14(1)-14(*n*) as described below. Frame 12 includes upper plate 30 and lower plate 32. In this example, upper plate 30 is movable with respect to lower plate 32 by simultaneously or independently using hydraulic driver system 16 and/or mechanical drivers 18 to provide a gap (G) that is adjustable to a selected value between a first dimensional value and a second dimensional value for the single pole assemblies 14(1)-14(*n*), as shown in FIG. 2, although other configurations may be utilized to provide for a gap (G) that is adjustable between a first dimensional value and a second dimensional value. By way of example, lower plate 32 could be movable with respect to upper plate 30, or both upper plate 30 and lower plate 32 could be movable with respect to one another. In one example, upper plate 30 and lower plate 32 may be movable girders supported by frame 12, which remains stationary. In this example, movement of upper plate 30 and lower plate 32 is constricted to a single direction. In this example, frame 12 is formed by two c-shaped plates connected by bridge structures at the ends of the plates, although other structures may be employed. Upper plate 30 and lower plate 32 are configured and positioned to minimize deformation. In one example, the root-mean-square for phase errors originated from deformation is less than 3 percent. In one example, upper plate 30 and/or lower plate 32 may include one or more stabilizing bars coupled thereto to either limit deformation or to provide additional deformation inward, i.e., in the opposite direction to deformation caused by the magnetic field. For example, the stabilizing bars may be steel bars. The steel stabilizing bars are configured to induce a temperature dependent deformation on upper plate 30 and/or lower plate 32 based on differential thermal expansion. The root mean square of magnetic field variation and phase error caused by deformation can be further reduced by varying the cross-section of the stabilizing bards along the device. This suppresses the sensitivity of undulator parameter $K_{und}$ to temperature, which increases magnet operation efficiency. Stability of $K_{und}$ is important for operation of radiation synchrotron sources, as variation causes drift in harmonic energies and undesirable photon flux during data collection.

Single pole assemblies 14(1)-14(*n*) are adjacently disposed within frame 12. Referring more specifically to FIG. 2, single pole assembly 14(1) is illustrated. Although only single pole assembly 14(1) is illustrated in FIG. 2, it is to be understood that single pole assemblies 14(2)-14(*n*) are the same in structure as single pole assembly 14(1). Single pole assembly 14(1) includes first member 34 coupled to upper plate 30 and a second member 36 coupled to lower plate 32. First member 34 and second member 36 each serve as holders that bear first permanent-magnet 38 and second permanent-magnet 40, respectively. In one example, first permanent-magnet 38 and second permanent-magnet 40 are soldered to first member 34 and second member 36 such as by a soldering technique as disclosed in U.S. Pat. No. 7,896,224, the disclosure of which is incorporated by reference herein, although other coupling techniques may be employed.

First member 34 and second member 36 position first permanent-magnet 38 and second permanent-magnet 40 such that they are spaced apart by adjustable gap (G). In this example, first member 34 is movable with the movement of upper plate 30 to move first member 34 relative to second member 36 to increase or decrease adjustable gap (G), although in other examples the second member 36 or both the first member 34 and second member 36 may be movable relative to one another to vary the adjustable gap (G).

First permanent-magnet 38 and second permanent-magnet 40 may be neodymium magnets (also known as NdFeB, NIB, or Neo magnet) with vanadium poles, although other magnets may be employed. The magnetic force between first permanent-magnet 38 and second permanent-magnet 40 ($F_{mag}(G)$) is dependent on the size of the adjustable gap (G). In one example, the adjustable gap (G) may be between about 6 mm to about 12 mm. In one example, at an adjustable gap (G) of 7 mm, the peak field is about 1.9 T and magnetic forces between single pole assemblies 14(1)-14(*n*) is about 492 kg-force (1084 lbs-force).

Hydraulic driver system 16 includes hydraulic source 42 coupled to hydraulic line 44, which is in fluid communication with at least one hydraulic cylinder 46. In this example, six hydraulic cylinders 46 are employed (three on each side of frame 12 of permanent-magnet insertion device 10, although other numbers of hydraulic cylinders may be employed in other configurations. Six hydraulic devices 46 were utilized in this example in order to keep the required hydraulic pressure below 2000 psi. In another example, one hydraulic cylinder is employed for each of single pole assemblies 14(1)-14(*n*). In another example, where upper plate 30 and lower plate 32 are both movable girders, six hydraulic cylinders 46 may be employed for each of upper plate 30 and lower plate 32 for a total of twelve hydraulic cylinders 46. In yet another example, twelve hydraulic cylinders 46 are employed on both upper plate 30 and lower plate 32 for a total of twenty-four hydraulic cylinders 46. Although certain examples are disclosed, any number of hydraulic cylinders may be employed that are able to compensate for the magnetic forces when adjustable gap (G) is at a minimum dimensional value.

In one example, hydraulic cylinders 46 are miniature hydraulic cylinders, such as model 20-01-07 manufactured by Vektek, Emporia, KS, by way of example only, although other hydraulic cylinders may be employed. Hydraulic cylinders 46 are coupled to frame 12 by aluminum rods and are configured such that the cylinder rods can apply a hydraulic force ($F_{hydr}$(P)) through the pistons of hydraulic cylinders 46 to drive upper plate 30 to move first member 34 relative to second member 36 to increase or to decrease the size of the adjustable gap (G). The hydraulic force ($F_{hydr}$(P)) is provided by the total piston area (A) of hydraulic cylinders 46 times the hydraulic pressure (P), which is determined by the pump of hydraulic source 42.

Each of hydraulic cylinders 46 are coupled to hydraulic line 44 such that the same pressure is provided from hydraulic source 42 to each of hydraulic cylinders 46. In one example, hydraulic source 42 is a hydraulic ram pump, such as Pittsburgh Hydraulics 10,000 PSI model, driven by a linear actuator, such as the Model EC2 linear actuator manufactured by Kollmorgen, Radford, VA, although other hydraulic sources may be employed. Hydraulic line 44 includes a pressure transducer (not shown) configured to measure the hydraulic force ($F_{hydr}$(P)). In one example, hydraulic source 42 of hydraulic driver system 16 is sized to deliver a maximum force greater than a magnetic force between first permanent-magnet 38 and second permanent-magnet 40 with the adjustable gap (G) at a minimum separation, such as 7 mm, by way of example only.

Mechanical drivers 18 are configured to move first member 34 relative to second member 36 to increase or to decrease the size of the adjustable gap (G). In this example, a pair of mechanical drivers 18 are employed on opposing ends of permanent-magnet insertion device 10. In another example, where upper plate 30 and lower plate 32 are both movable, four mechanical drivers 18 (two for each of upper plate 30 and lower plate 32) may be employed. Mechanical drivers 18 may be positioned at "minimum sag" points for upper plate 30, by way of example. In one example, mechanical drivers 18 are mechanical linear actuators, such as compact z-stages. Mechanical drivers 18 are coupled to upper plate 30 and are configured to apply a force ($F_{stage}$) to move upper plate 30 to adjust the position of first member 34, for example, with respect to second member 36. Mechanical drivers 18 are positioned between upper plate 30 and flex plate 24, which is coupled to frame 12 by rods 48. Although two rods 48 are shown in FIG. 1, it is to be understood that additional rods may be located on the other side of insertion device 10. In this configuration, movement of mechanical drivers 18 provide an additional force on upper plate 30 to modify the adjustable gap (G). In this example, the force provided by mechanical drivers 18 ($F_{stage}$) is measured using strain gauges 26 as described below.

Controller 20 is coupled to and configured to drive the linear actuator of hydraulic source 42 and mechanical drivers 18. Controller 20 is also coupled to measurement devices 22 and strain gauges 26 to receive data therefrom, as described in further detail below. In one example, controller 20 includes one or more processor(s) 50, memory 52, and communication interface 54 that are coupled together by bus 56 or other communication link, although controller 20 can include other types and/or numbers of elements in other configurations. In one example, controller 20 includes a stepping motor controller such as the Galil Motion Control DMC_2182, although other controllers that are configured to drive the linear actuator of hydraulic source 42 and mechanical drivers 18 may be employed.

In this example, processor(s) 50 of controller 20 may execute programmed instructions stored in memory 52 for any number of the functions or other operations illustrated and described by way of the examples herein, including driving the linear actuator of hydraulic source 42 and mechanical drivers 18 to adjust the adjustable gap (G). Processor(s) 50 may also adjust the forces applied by hydraulic driver system 16 and mechanical drivers 18 in response to data received from measurement devices 22 or strain gauges 26 to provide a feedback circuit (e.g., a closed-loop feedback system) to maintain the size of adjustable gap (G) between first permanent-magnet 38 and second permanent-magnet 40 at a selected value for each of single pole assemblies 14(1)-14(*n*). Processor(s) 50 of controller 20 may include one or more CPUs, GPUs, or general processors with one or more processing cores, for example, although other types of processor(s) can be used.

Controller 20 is configured to determine a magnetic force between first permanent-magnet 38 and second permanent-magnet 40 based on the size of the adjustable gap (G) between first permanent-magnet 38 and second permanent-magnet 40. Controller 20 is also configured to apply a first force to single pole assemblies 14(1)-14(*n*) via the hydraulic driver system 16 and to apply a second force to single pole assemblies 14(1)-14(*n*) via the mechanical drivers 18, which both act on upper plate 30 of frame 12 in this example. The first force counters or balances a first portion of the magnetic forces, and the second force counters or balances a second portion of the magnetic forces, such that a combination of the first force and the second force counter the magnetic forces between first permanent-magnet 38 and second permanent-magnet 40 to provide stability in the size of the adjustable gap (G) between first permanent-magnet 38 and second permanent-magnet 40.

Memory 52 of controller 20 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to processor(s) 50 can be used for memory 52.

Accordingly, memory 52 of controller 20 can store application(s) that can include executable instructions that, when executed by controller 20, cause controller 20 to perform actions, such as generating one or more driving signals to drive the linear actuator of hydraulic source 42 and mechanical drivers 18 to adjust the adjustable gap (G), or providing instructions for adjusting the drive signals in response to data received from measurement devices 22 or strain gauges 26, for example, as described by way of the examples herein. The application(s) can be implemented as modules or components of other application(s). Further, the application(s) can be implemented as operating system extensions, modules, plugins, or the like.

The communication interface 54 of controller 20 operatively couples and communicates between controller 20, hydraulic source 42, mechanical drivers 18, measurement devices 22, and strain gauges 26, which are all coupled together by one or more communication network(s), although other types and/or numbers of connections and/or configurations to other device and/or elements can be used. By way of example only, the communication network(s) can include local area network(s) (LAN(s)) or wide area network (s) (WAN(s)), and/or wireless networks, although other types and/or number of protocols and/or communication network(s) can be used.

Controller 20 may also include a program interface for displaying the monitored parameters, including hydraulic pressure, mechanical force, size of adjustable gap (G), by way of example. Program interface may also allow for control of the monitored parameters.

Although controller 20 is illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that when executed by the processor of the controller 20, cause the processor to carry out steps necessary to implement the methods of the examples of this technology that are illustrated and described herein.

Measurement devices 22 are configured to measure a size of the adjustable gap (G) between first permanent-magnet 38 and second permanent-magnet 40 for at least one of single pole assemblies 14(1)-14(2). Although two measurement devices 22 are illustrated in FIG. 1, a plurality of measurement devices may be employed to measure the size of the adjustable gap (G) for each of single pole assemblies 14(1)-14(*n*). In one example, measurement devices 22 are digital indicators or encoders configured to measure the size of the adjustable gap (G). In one example, measurement devices 22 are Renishaw TONiC encoders having a resolution of 0.5 μm. Measurement devices 22 are coupled to controller 20 to provide date regarding the size of the adjustable gap (G) to controller 20.

Flex plate 24 is coupled to frame 12 by rods 48. In this example, as shown in FIG. 1, four rods 48 are employed. Flex plate 24 is coupled to mechanical drivers 18 such that the force applied by mechanical drivers 18 introduces a strain on flex plate 24. Strain gauges 26 are affixed to flex plate 24 and are positioned and configured to measure local strain on flex plate 24 from mechanical drivers 18, which may be used to determine the force applied by mechanical drivers 18 ($F_{stage}$).

Another aspect of the present technology relates to a computer-controlled method of maintaining a stable insertion device gap in a permanent magnet insertion device. The method includes receiving, via a controller, measurement data for a gap between a first permanent-magnet and second permanent-magnet in a single pole assembly, the first permanent-magnet being attached to a first portion of the single pole assembly and the second permanent-magnet being attached to a second portion of the single pole assembly, the second portion of the insertion device being movable relative to the first portion of the single pole assembly to change the gap between the first permanent-magnet and the second permanent-magnet. A magnetic force is determined between the first permanent-magnet and the second permanent-magnet. A hydraulic driver is driven to apply a first force to the single pole assembly in opposition to the magnetic force. A mechanical driver is driver to apply a second force to the single pole assembly in opposition to the magnetic force. The first force and second are balanced to maintain the measured gap at a setting selected from a plurality of available settings within a range of settings.

Figure 3:
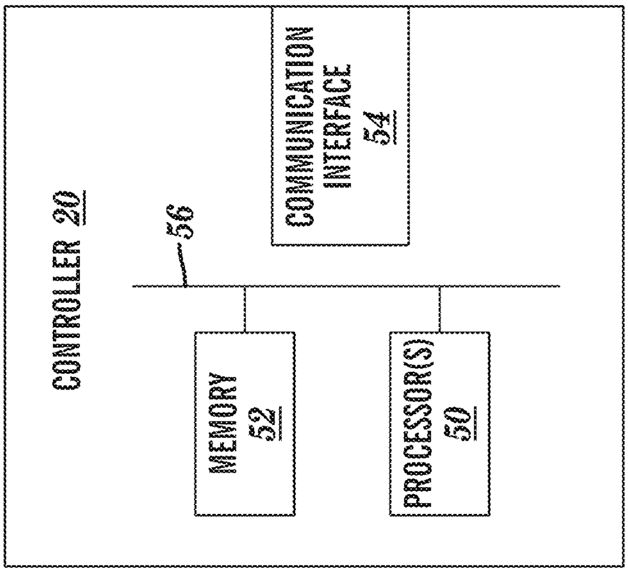
FIG. 3 is a block diagram of an exemplary controller for use with the permanent magnet insertion device shown in FIG. 1.

An exemplary operation of permanent-magnet insertion device 10 will now be described with reference to FIGS. 1-3. The method of the present technology allows for providing a stable gap between first magnet 38 and second magnet 40 for each of single pole assemblies 14(1)-14(*n*). For permanent-magnet insertion device 10, in a steady state there is a balance between the magnetic, hydraulic, and mechanical forces applied first permanent-magnet 38, for example, is given by the following equation;

$$F_{mag}(G)+F_{hydr}(P)+F_{stage}=0 \tag{1}$$

Although operation will be described for single pole assembly 14(1), the operation is the same for each of single pole assemblies 14(1)-14(*n*). First, controller 20 receives measurement data for the size of the adjustable gap (G) between first permanent-magnet 38 and second permanent-magnet 40 in single pole assembly 14(1), for example, as shown in FIG. 2. In this example, the measurement data is received from measurement devices 22, which may be digital indicators or encoders configured to measure the size of the adjustable gap (G).

Next, controller 20 determines the magnetic force $F_{mag}$(G) between first permanent-magnet 38 and second permanent-magnet 40. The magnetic force is based on the size of the adjustable gap (G). Controller 20 then drives hydraulic driver system 16 and mechanical drivers 18 to respectively apply a first force $F_{stage}$ and a second force $F_{hydr}$(P) in opposition to first and second portions of the magnetic force $F_{mag}$(G), respectively. Controller 20 balances the first force $F_{stage}$ and a second force $F_{hydr}$(P) to maintain the adjustable gap (G) against the magnetic force $F_{mag}$(G), using equation (1), at a setting selected from a plurality of available settings within a range of settings to provide a stable position of first magnet 38 with respect to second magnet 40. In one example, the adjustable gap (G) is between about 6 mm to about 12 mm and may be held at positions within that range.

Controller 20 may balance equation (1) in any manner. In one example, the first portion of the magnetic forces counteracted by first force $F_{stage}$ comprises less than about 50% of the magnetic force $F_{mag}$(G) between first permanent-magnet 38 and second permanent-magnet 40 and the second portion of the magnetic forces counteracted by the second force $F_{hydr}$(P) comprises greater than about 50% of the magnetic force $F_{mag}$(G) between first permanent-magnet 38 and second permanent-magnet 40. In another example, the first portion of the magnetic forces counteracted by first force $F_{stage}$ comprises less than about 10% of the magnetic force $F_{mag}(G)$ between first permanent-magnet 38 and second permanent-magnet 40 and the second portion of the magnetic forces counteracted by the second force $F_{hydr}(P)$ comprises greater than about 90% of the magnetic force $F_{mag}(G)$ between first permanent-magnet 38 and second permanent-magnet 40. In yet another example, the first portion of the magnetic forces counteracted by first force $F_{stage}$ comprises less than about 5% of the magnetic force $F_{mag}(G)$ between first permanent-magnet 38 and second permanent-magnet 40 and the second portion of the magnetic forces counteracted by the second force $F_{hydr}(P)$ comprises greater than about 95% of the magnetic force $F_{mag}(G)$ between first permanent-magnet 38 and second permanent-magnet 40. In one example, controller 20 maintains $F_{stage}$ at a level of less than about 10% of the magnetic force $F_{mag}(G)$ between first permanent-magnet 38 and second permanent-magnet 40. This reduces the burden on mechanical drivers 18, which allows the size and complexity of permanent-magnet insertion device 10 to be reduced.

EXAMPLES

Example 1—Experimental Design

A hydraulic driver prototype was installed on a 30 cm-long model of a 2 Tesla Compact Wiggler similar to a Cornell Compact Undulator, as disclosed in A. Temnykh et al., "Compact Undulator for the Cornell High Energy Synchrotron Source: Design and Beam Test Results," J. Phys.: Conf. Ser. 425 032004 (2013), the disclosure of which is incorporated herein by reference in its entirety. The hydraulic driver prototype was installed to vary the insertion device (ID) gap.

The magnetic structure of the experimental model included NbFeB permanent magnet blocks and vanadium poles. At a minimum ID gap of 7 mm, peak field was about 1.9 T and magnetic forces between magnetic arrays were approximately 492 kg-force (1084 lbs-force). The upper array of magnets was made movable in the vertical direction. The gap-varying mechanism included both hydraulic (main) and mechanical (trimming) drivers.

The hydraulic driver included six miniature hydraulic cylinders (Vektek, model 20-01-07). Each cylinder had a piston with 0.11 square inch area, 0.75" stroke, 550 lb. load capacity and a ⅝" DIA threaded body. All cylinders were connected to a single hydraulic line equipped with a pressure transducer (WIKA, Type A-10/0-3000 psi). Cylinder bodies were attached to the frame (3 on each side) using aluminum bars. The cylinder rods pushed vertically on upper array extensions. The number of cylinders was chose to keep the required hydraulic pressure below 2000 psi. For that pressure range, a large variety of hardware and fittings is available in local automotive or hardware stores. In the experimental setup, 2000 psi pressure fed to 6 cylinders provided a maximum force of 1320 lbs-force, which exceeded the required 1084 lbs.-force by a reasonable 20% margin.

As a hydraulic pressure source, a hydraulic ram pump (Pittsburgh Hydraulics 10,000 psi model) drive by a linear actuator (Kollmorgen EC2) was utilized. The mechanical driver included two custom compact z-stages with a few hundred pounds capacity each and a "flex" plate attached to the frame by four rods. The two z-stages were placed between the flex plate and the upper magnet array (one on each end of the model) and were clamped down to both. By moving the two z-stages, additional forces were applied between the upper array and the frame. Two strain gauges (Omega Engineering) were glued to the flex plate in proximity of the z-stages, monitored local strain proportional to the z-stage load.

Two digital indicators (Fowler-Sylvac Mark VI) with about 1 micron resolution were used to monitor the upper array displacement with respect to the frame (ID gap variation) on both ends of the model. To drive the z-stages and the linear actuator governing the hydraulic pump, 3 channels of a stepping motor controller (Galil Motion Control DMC_2182) were used.

Example 2—Operation

Figure 4:
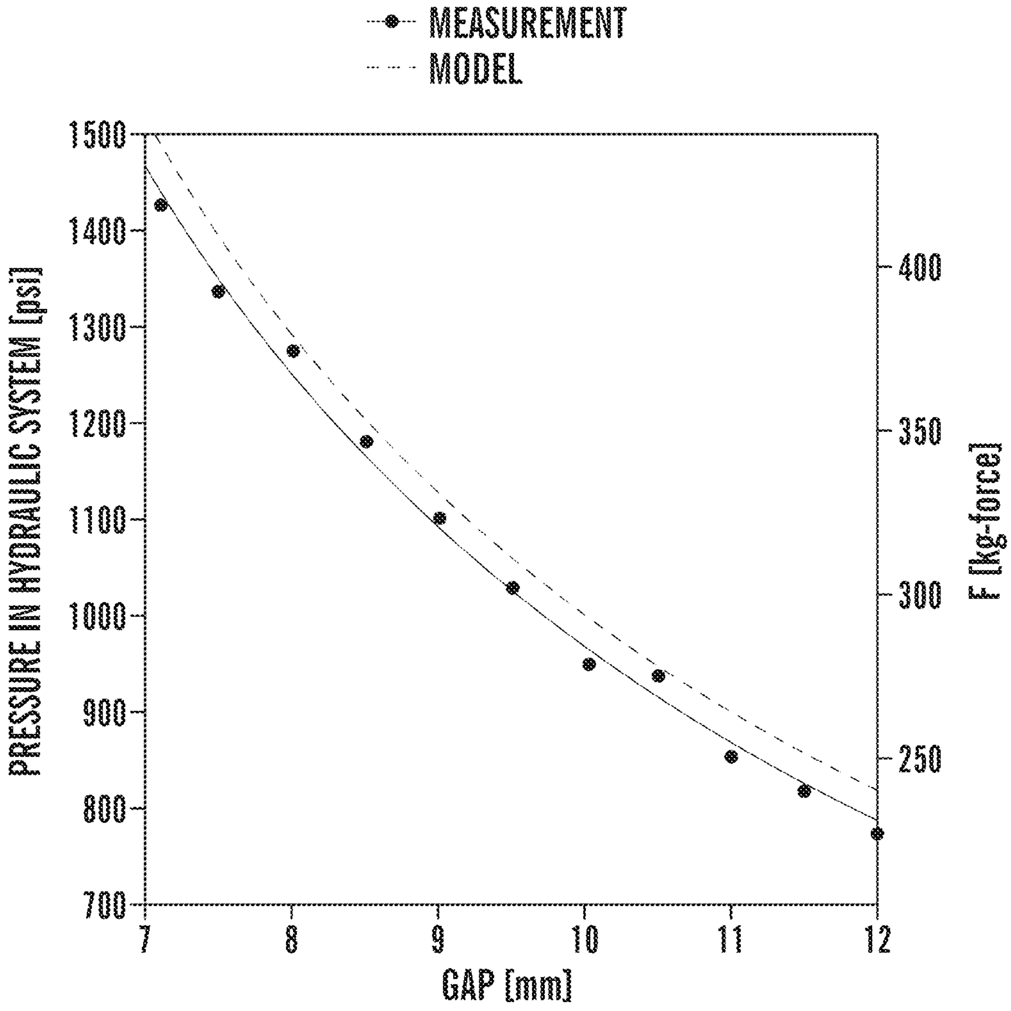
FIG. 4 is a graph of measured and expected dependencies of hydraulic pressure on insertion device gap for an experimental setup.

The dependence of the required hydraulic pressure (P) on ID gap (g) while keeping the strain on the flex plate (based on force from mechanical driver) close to zero. For each step, the ID gap was changed by moving the z-stages. After that, the hydraulic pressure was adjusted by the hydraulic pump to have zero strain on the flex plate. In this way, at each point a balance was achieved between the magnetic and hydraulic forces. The measured and expected dependencies of hydraulic pressure on ID gap are illustrated in FIG. 4. The solid line shows the measurement, while the dashed line presents the data depicted by 3D magnetic modeling of the system using OPERA software. FIG. 4 shows that the measurement and prediction are in good agreement.

To control the ID gap, a program was developed using LabView software. The program executed two independent feedback loops at a 1 kHz rate. In the first loop, the program monitored the upper array position by reading the digital indicators while moving the z-stages in small steps toward the target. Before each step, the program checked the strain gauges, i.e., the z-stages load. The motion was activated only if the load was "low." The "low load" condition was satisfied only when the lift force created by the hydraulic cylinders entirely compensated for the attractive magnetic forces between the arrays.

The second loop controlled the hydraulic pressure. The program read the digital position indicators, calculated the ID gap, and using the data presented in FIG. 4, calculated the hydraulic pressure needed for about 95% compensation of the magnetic forces. The desired pressure was compared with the actual (measured by the pressure transducer) and, if the desired pressure was higher, the program activated the hydraulic pump to add oil into the system. If the desired pressure was lower than the actual, the program just cycled idly until the actual pressure was reduced due to leaks.

Example 3—Long-Term Stability Check

The reason for the long-term stability concern was the assumption that small leaks in a hydraulic system can create difficulties in measuring a stable pressure for a long time, which is required for a steady ID gap. To address this problem, several critical parameters were recorded, such as magnetic field, hydraulic pressure, upper array position, etc., were measured for 120 hours (5 days) at a 1 Hz rate while maintaining a 13 mm ID gap. FIGS. 5A-5D illustrate the experimental results for (A) upper array position measured with gauges, (B) pressure in hydraulic system, (C) magnetic field and temperature in the gap measured with Hall Probe and thermistor, and (D) magnetic field plotted versus temperature for the 5 day trial.

Figure 5A:
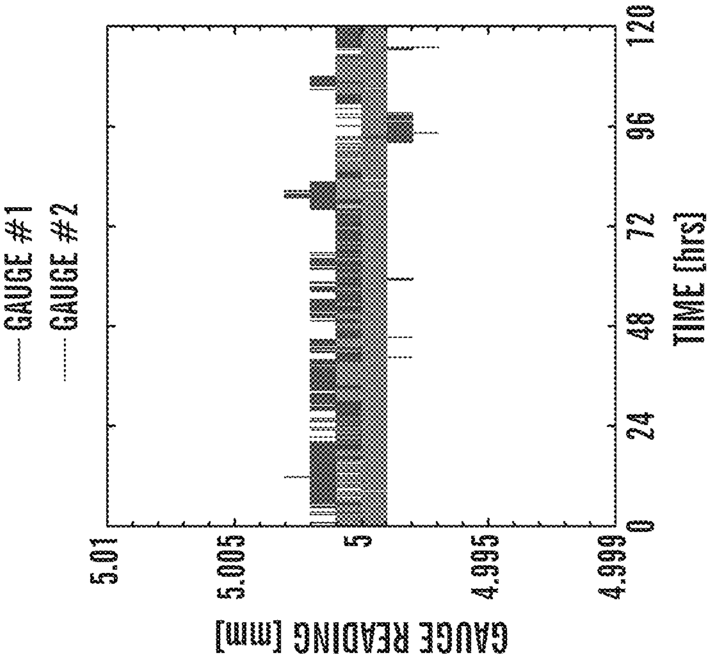
FIGS. 5A-5D illustrate the experimental results for (A) upper array position measured with gauges, (B) pressure in hydraulic system, (C) magnetic field and temperature in the gap measured with Hall Probe and thermistor, and (D) magnetic field plotted versus temperature for a five day trial of the experimental setup.

The plot in FIG. 5A shows the 120 hours (5 day) record of both ends of the upper array position. The target position was 5 mm. The data indicates no more than 2 microns deviation from the target. Taking into account a 1-micron gauge resolution and the +−2-micron dead band used in the feedback loop, a +−2-micron deviation from the target is quite satisfactory.

Figure 5B:
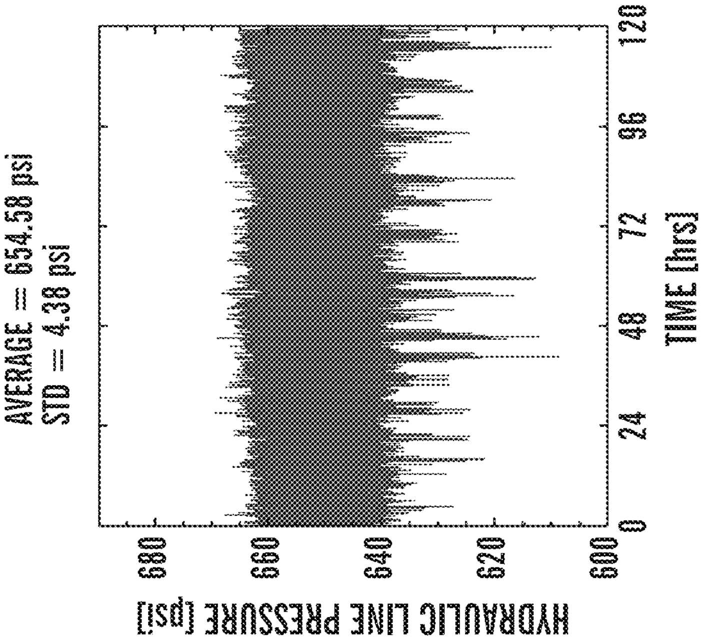

FIG. 5*b* presents the hydraulic system pressure recorded over the 120-hour time frame. The data indicates a 654.58 psi average pressure with a standard deviation of 4.38 psi. The deviation is consistent with the given transducer performance specifications: ~3 psi repeatability and 3 psi drift. Note that both parameters, end positions and pressure, are in fact the signals kept constant by feedback loops. Thus, if these signals are drifting due to sensors imperfection, the measured parameters will not agree with actual, but the recorded data will not show that.

Figure 5D:
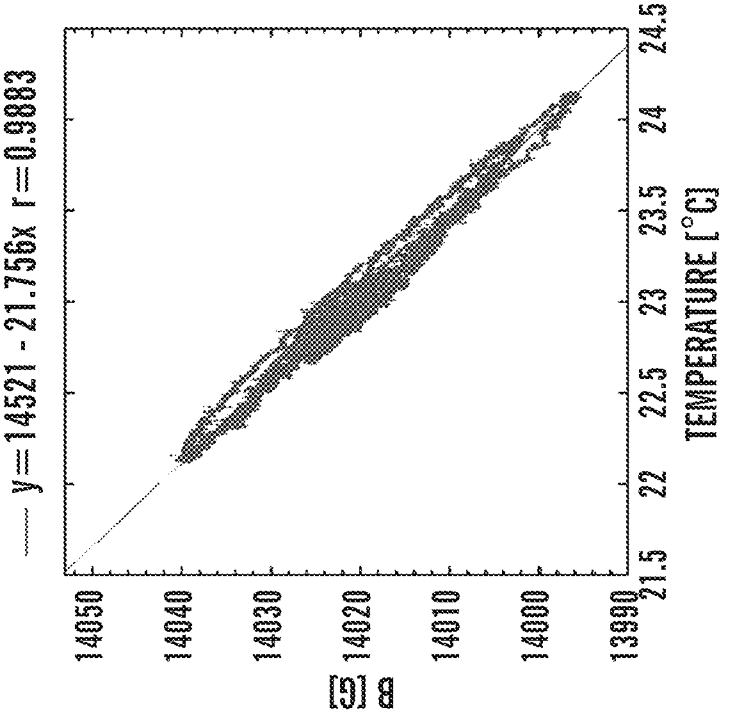
Figure 5C:
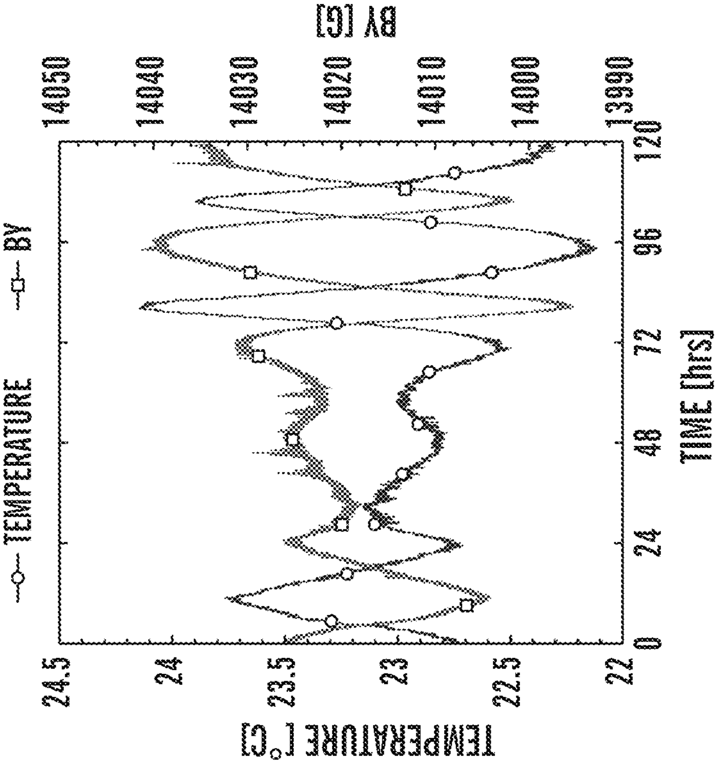

The actual magnetic field in the ID gap is plotted in FIG. 5C along with permanent magnet material temperature. The temperature data (left scale) shows 22.99 degrees Celsius average temperature with 2 degrees Celsius peak-to-peak variation, correlated with the time of day. The cause of the variation was ambient temperature changes in the building. Magnetic field data shows a 14021.04 Gauss average field and approximately 45 Gauss peak-to-peak variation. The latter is strongly correlated with temperature.

To evaluate this correlation, magnetic field was plotted as a function of temperature as shown in FIG. 5D. The plot reveals a linear dependence and the fit indicates −21.75 Gauss or −0.15% field variation per one degree Celsius of temperature change. This well agrees with what one can expect taking into account a −0.12% contribution from NbFeB PM magnetization reduction and −0.024% from ID gap increase due to aluminum frame thermo-expansion, giving a −0.144% total field variation. Now, knowing how the field depends on temperature, the raw field data is corrected to project it to the condition of a constant (23 degrees Celsius) ambient temperature.

Figure 6:
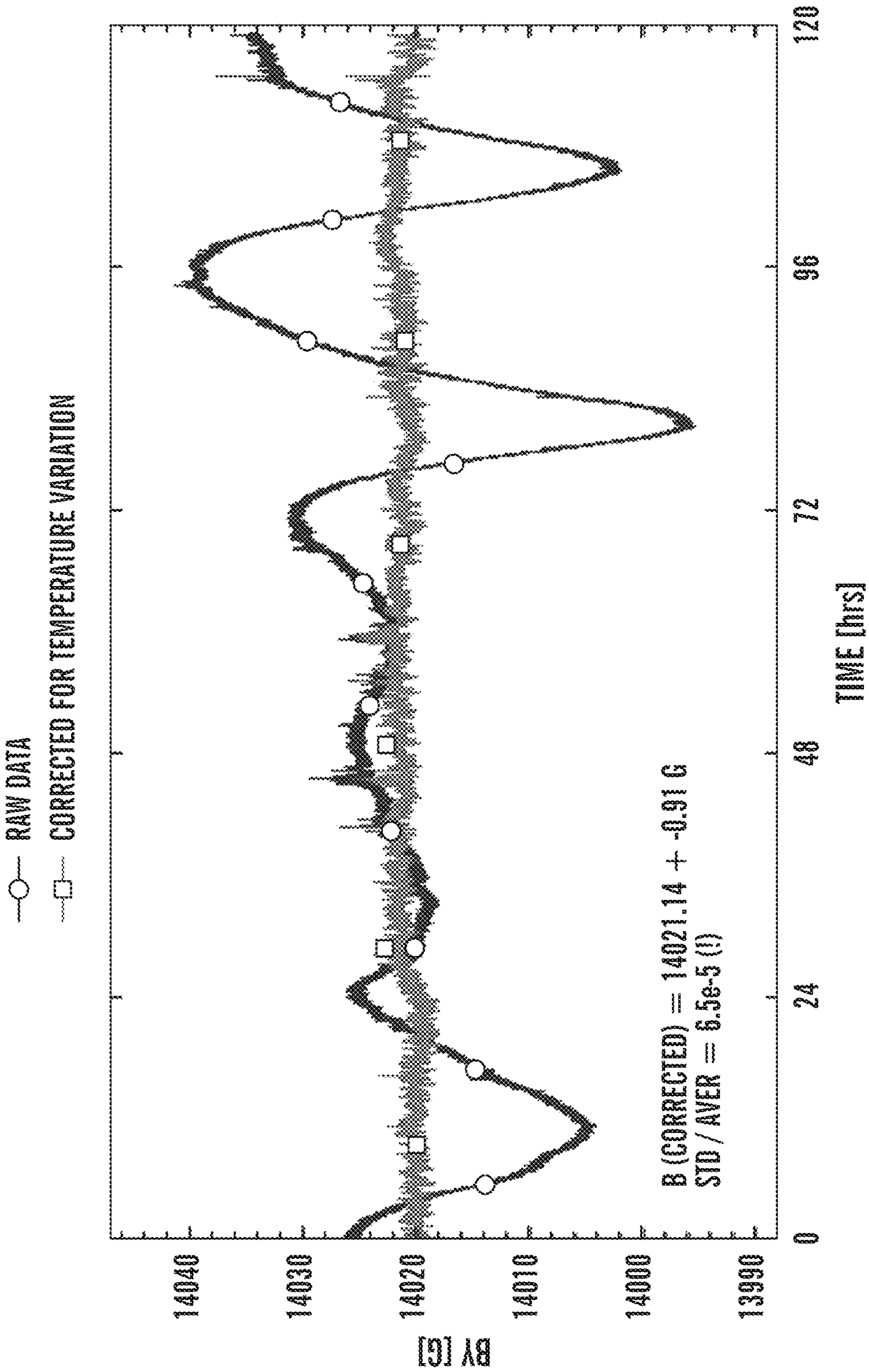
FIG. 6 illustrates raw and temperature corrected magnetic field data based on the data in FIG. 5D.

The result of the projection, together with the original record, are plotted in FIG. 6. The projected data has much less variation: It shows a 14021.14-Gauss average field with just 0.91 Gauss standard deviation. That translates to (at least) 0.65e-4 of normalized magnetic field stability. Such stability will satisfy the most demanding applications. This small deviation of the field also validates the stability seen in the record of the upper array position and the hydraulic pressure.

Example 4—Repeatability Check

Figure 7A:
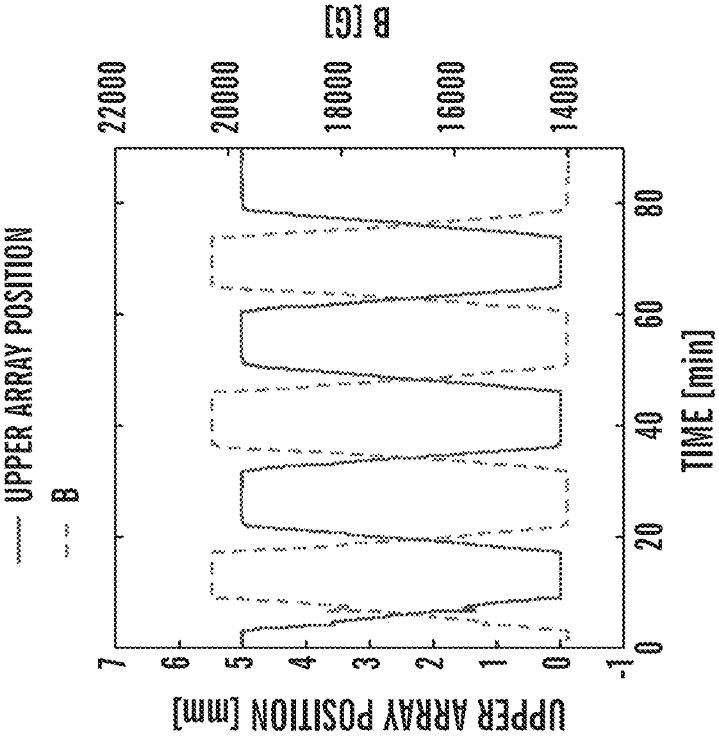
FIGS. 7A and 7B illustrate data from a repeatability experiment using the experimental setup.
Figure 7B:
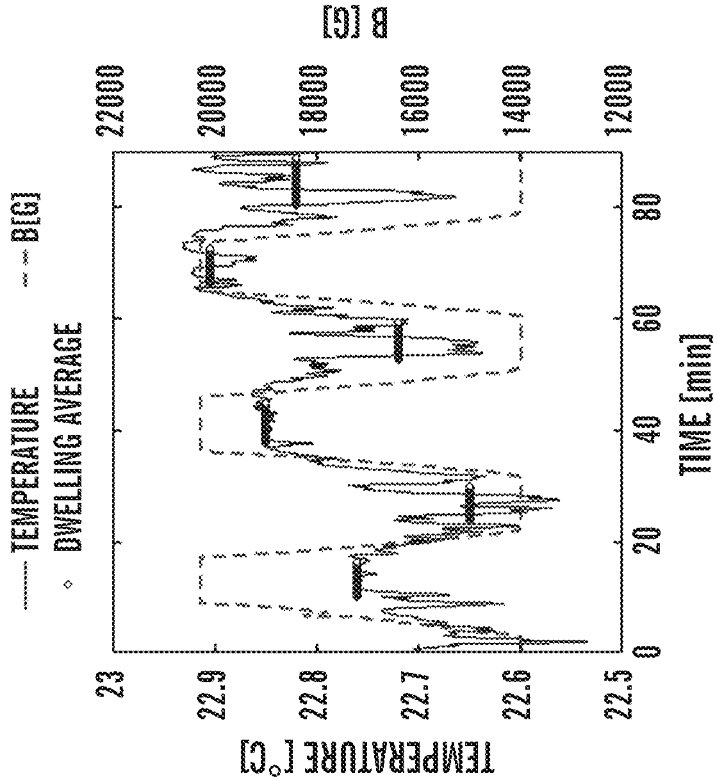

In the repeatability test, the upper array position was cycled between "zero" and 5 mm in respect to the frame. That corresponded to the ID gap changing between 7 and 13 mm. At each position, the positioned was dwelled at for ~10 minutes while recording position, field, temperature, etc. FIGS. 7A and 7B illustrate the data from the process.

FIG. 7A shows a periodic change of the upper array position and, as expected, it is correlated with the magnetic field strength. FIG. 7B shows three data sets: raw temperature signal from a thermistor located in the wiggler gap, the temperature averaged over the dwell time, and the magnetic field. The thermistor raw data is quite noisy, but it reveals a slow temperature drift of about 0.25 degree Celsius during the experiment. The temperature data averaged over the dwell time confirms this drift and, in addition, reveals a dependence of the thermistor signal on ambient magnetic field. Comparing averaged temperatures for "zero" and 5 mm upper array positions, corresponding to ~2 kG and 1.4 kG field in the ID gap, one can see a fast ~0.1 degrees Celsius temperature signal change. This change cannot be physical, because of the significant model mass and absence of fast-varying heat sources. Most likely, it is caused by the dependence of thermistor characteristics on the magnetic field.

Figure 8B:
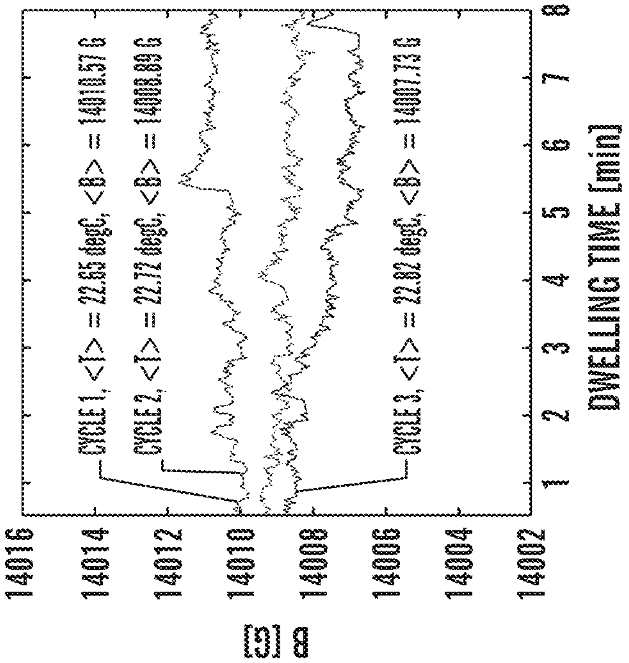
FIGS. 8A and 8B are graphs of field records for three different cycles of the repeatability experiment.
Figure 8A:
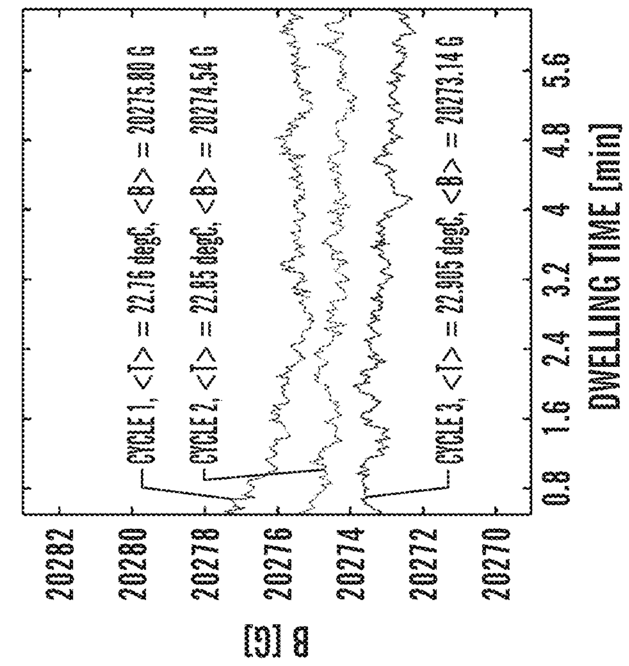

The temperatures averaged over the dwell time were used to correct for the effect of permanent magnet material magnetization change due to temperature drift. FIG. 8 shows the field for all three cycles in fine scale: a) at "zero" position and b) at "5 mm". Boxes on top display average temperatures and average field during the dwell time. On both plots in FIG. 8, a systematic drift of the field and average temperature from one cycle to another is illustrated. Knowing how the field depends on temperature, the field that would be measured at a constant 23 degrees Celsius temperature was measured. The data, together with the results of statistical analysis, are summarized in Table 1, set forth below.

TABLE 1

Measured field and field projected to 23° C.

| | "Zero" point | | | "5 mm" Point | | |
|---|---|---|---|---|---|---|
| Cycle # | <T> | <B> raw | <B> @ 23 deg C. | <T> | <B> raw | <B> @ 23 deg C. |
| 1 | 22.76 | 20275.8 | 20268.26 | 22.65 | 14010.57 | 14002.97 |
| 2 | 22.85 | 20274.54 | 20269.83 | 22.72 | 14008.89 | 14002.81 |
| 3 | 22.91 | 20273.14 | 20270.31 | 22.82 | 14007.73 | 14003.82 |
| <B>= | | 20274.49 | 20269.47 | | 14009.06 | 14003.20 |
| std= | | 1.33 | 1.07 | | 1.43 | 0.54 |
| std/<B>= | | 6.6E−05 | 5.3E−05 | | 1.0E−04 | 3.9E−05 |

The raw data analysis indicated 1.33 and 1.43 Gauss RMS field repeatability, corresponding to 6.6e-5 and 1.0e-4 relative field change. The analysis of the data which was corrected for temperature variation, showed 1.07 and 0.54 Gauss RMS of the field variation corresponding to 5.3e-5 and 3.9e-5 relative field change. This high level of repeatability will satisfy the most demanding applications.

Accordingly, the present technology provides for a permanent-magnet insertion device that provides for an adjustable gap between magnet arrays to position the arrays with a high degree of accuracy. The present technology further provides a feedback loop that allows for maintain a stable positioning of the magnetic arrays. The present technology is relatively inexpensive and easy to manufacture.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A permanent magnet insertion device comprising:

a frame;

a plurality of single pole assemblies adjacently disposed within the frame, each of the plurality of single pole assemblies comprising a first member bearing a first permanent-magnet and a second member bearing a second permanent-magnet, the first permanent-magnet and the second permanent-magnet being spaced apart by a gap that is adjustable to a selected dimensional value between a first dimensional value and a second dimensional value, the first dimensional value being smaller than the second dimensional value, at least one of the first member or the second member being movable relative to the other of the first member or the second member to increase or to decrease a dimensional value of the gap;

a hydraulic driver configured to move the first member relative to the second member to increase or to decrease the dimensional value of the gap; and a mechanical driver configured to move the first member relative to the second member to increase or to decrease the dimensional value of the gap.

2. The permanent magnet insertion device according to claim 1, wherein the hydraulic driver comprises at least one hydraulic cylinder in fluid communication with at least one of the first member or the second member of each of the plurality of single pole assemblies via at least one hydraulic line.

3. The permanent magnet insertion device according to claim 1, wherein the hydraulic driver comprises a plurality of hydraulic cylinders in fluid communication with at least one of the first member or the second member of each of the plurality of single pole assemblies via at least one hydraulic line.

4. The permanent magnet insertion device according to claim 1, wherein the hydraulic driver comprises at least one hydraulic cylinder for each single pole assembly.

5. The permanent magnet insertion device according to claim 1, wherein the mechanical driver comprises a plurality of mechanical linear actuators.

6. The permanent magnet insertion device according to claim 1, wherein the hydraulic driver is sized to deliver a maximum force greater than a magnetic force between the first permanent-magnet and the second permanent-magnet with the gap being set at the first dimensional value.

7. The permanent magnet insertion device according to claim 1 further comprising:

a controller configured to drive the hydraulic driver and the mechanical driver.

8. The permanent magnet insertion device according to claim 7, wherein the controller is configured to determine a magnetic force between the first permanent-magnet and the second permanent-magnet based on the dimensional value of the gap between the first permanent-magnet and the second permanent-magnet and to apply a first force to the plurality of single pole assemblies via the hydraulic driver and to apply a second force to the plurality of single pole assemblies via the mechanical driver, wherein the first force counters a first portion of the magnetic force, wherein the second force counters a second portion of the magnetic force, and wherein a combination of the first force and the second force counters the magnetic force between the first permanent-magnet and the second permanent-magnet so that the dimensional value of the gap is stable between the first permanent-magnet and the second permanent-magnet.

9. The permanent magnet insertion device according to claim 8, wherein the first portion of the magnetic forces comprises less than about 50% of the magnetic force between the first permanent-magnet and the second permanent-magnet and the second portion of the magnetic forces comprises greater than about 50% of the magnetic force between the first permanent-magnet and the second permanent-magnet.

10. The permanent magnet insertion device according to claim 8, wherein the first portion of the magnetic forces comprises less than about 10% of the magnetic force between the first permanent-magnet and the second permanent-magnet and the second portion of the magnetic forces comprises greater than about 90% of the magnetic force between the first permanent-magnet and the second permanent-magnet.

11. The permanent magnet insertion device according to claim 8, wherein the first portion of the magnetic forces comprises less than about 5% of the magnetic force between the first permanent-magnet and the second permanent-magnet and the second portion of the magnetic forces comprises greater than about 95% of the magnetic force between the first permanent-magnet and the second permanent-magnet.

12. The permanent magnet insertion device according to claim 8, wherein the controller comprises a part of a closed-loop feedback system constructed to maintain the dimensional value of the gap between the first permanent-magnet and the second permanent-magnet at a selected value for each of the plurality of single pole assemblies.

13. The permanent magnet insertion device according to claim 8, wherein the controller is configured to maintain the second force at a level of less than about 10% of the magnetic force between the first permanent-magnet and the second permanent-magnet.

14. The permanent magnet insertion device according to claim 1, wherein the mechanical driver further comprises a flex plate attached to the frame and at least one strain gauge affixed to the flex plate to measure a local strain.

15. The permanent magnet insertion device according to claim 1 further comprising:

at least one measurement device to determine the dimensional value of the gap between the first permanent-magnet and the second permanent-magnet for at least one of the plurality of single pole assemblies.

16. The permanent magnet insertion device according to claim 1 further comprising:

a plurality of measurement devices to determine the dimensional value of the gap between the first permanent-magnet and the second permanent-magnet for each of the plurality of single pole assemblies.

17. The permanent magnet insertion device according to claim 16, wherein at least one of the plurality of measurement devices include a digital indicator or encoder.

18. The permanent magnet insertion device according to claim 1, wherein a difference between the first dimensional value and the second dimensional value is between about 6-12 mm.

* * * * *